April 14, 1970     D. M. HOMS     3,506,078

BEAM STRUCTURE FOR MULTIPLE WEIGHING SYSTEMS

Filed Nov. 1, 1968

INVENTOR.

DOUGLAS M. HOMS

BY

ATTORNEY

United States Patent Office 3,506,078
Patented Apr. 14, 1970

3,506,078
BEAM STRUCTURE FOR MULTIPLE
WEIGHING SYSTEMS
Douglas M. Homs, Hillsborough, Calif. (% Douglas Homs Corporation, 1538 Industrial Way, Belmont, Calif. 94002)
Filed Nov. 1, 1968, Ser. No. 772,490
Int. Cl. G01g 1/28
U.S. Cl. 177—235        3 Claims

ABSTRACT OF THE DISCLOSURE

A main poise for a scale beam engages notches spaced along either of two beams. The spacing of one set of notches corresponds to one system of weights (e.g. avoirdupois) and the other to a different system (e.g. metric). The support for the poise is so constructed that knife edges carried thereby will selectively engage one, and one only, set of notches at a time, thereby eliminating possible incorrect reading of the beam. A fractional poise has a pointer indicating fractions of the main poise readings in both systems.

---

This invention relates to a new and improved beam structure for multiple weighing systems. More particularly, the present invention relates to means whereby the main poise of a beam scale may be adjusted in position so that it is accurately located with respect to the notches spaced along one but not both of two notched beams. The notches on one beam may correspond to the graduations for one system of weights, e.g. avoirdupois, while the notches on the other beam correspond to the spacing for a different weight system, e.g. metric.

A principal feature and advantage of the present invention is the fact that a single scale may easily be used to weigh in one system or the other and when converted to one of the two systems mistakes from inaccuracy in positioning the poise are eliminated.

Another feature of the invention is the simplicity with which the adjustment of the poise from one system to the other may be accomplished without the use of special tools or skills and also without the necessity of replacement, addition, or elimination of parts.

Other objects of the present invention will become apparent upon reading the following specification and referring to the accompanying drawings in which similar characters of reference represent corresponding parts in each of the several views.

Figure 1:
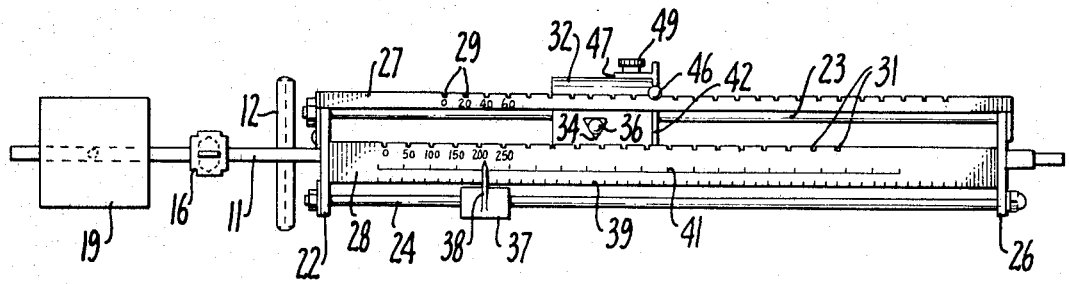
FIG. 1 is a top plan view of a scale beam and associated parts constructed in accordance with the present invention.
Figure 2:
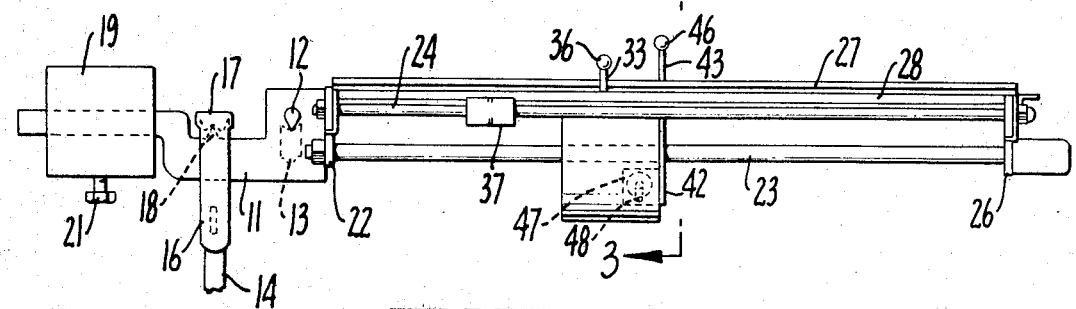
FIG. 2 is a front elevational view thereof.

The scale construction partially illustrated herein is representative of one form which is commercially available, but it will be understood that considerable modification may be made in the structure. Lever 11 has a knife edge 12 projecting from either side thereof and fitting into fulcrums 13. A steelyard 14 is connected to the platform (not shown) on which the load is placed by a system of levers not herein illustrated and forming no part of the present invention. A fitting 16 at the top of the steelyard carries a fulcrum 17 fitting over the knife edge 18 on beam 11. To the left of fitting 16 is tare poise 19 held in adjustable position by screw 21. To the right of knife edge 12 is a transverse inner bracket 22 which receives the ends of two smooth, horizontal, longitudinally extending rods 23, 24. At the opposite ends of rods 23, 24 is an outer bracket 26. Extending between brackets 22 and 26 are two scale beams 27, 28. Each of the beams 27, 28 is provided with notches 29, 31, spaced along their lengths. The spacing of notches 29 are for multiples to measure in the metric system, here shown as twenty kilogram increments. Beam 28 is used for measurement in fifty pound units per notch 31. Main poise 32 has a hole therein and slides along rod 23 which fits through the hole and balances the force applied to beam 11 by steelyard 14. Extending forwardly of poise 32 is a projection 33 having a pivot 34 shaped in a knife edge on its bottom and carrying at its outer end a knob 36. When poise 32 is in the position of adjustment for weighing in pounds, pivot 34 is in a lower position than that shown in FIG. 1 so that it engages in any of the notches 31 as it is moved along the edge of beam 27. The user lifts the knob 36 to disengage pivot 34 from the particular notch 31 in which it is resting and slides main poise 32 along rod 23 and then releases the knob 36 so that pivot 34 accurately fits in one of the notches 31. The hole in poise 32 through which rod 23 fits is off-center and hence poise 32 tends to turn under force of gravity counterclockwise as viewed in FIGS. 3 and 4 and thus the pivot tends to fit into the notches. Assuming that the load being weighed is not an even multiple of 50 pounds, the secondary poise 37 is moved along rod 24 until the beam is in balance. Secondary poise 37 carries a pointer 38 which is in juxtaposition to two fractional scales 39, 41 marked on beam 28. Fractional scale 39 has markings corresponding to fractions of the units of the notches 31. Assuming, for example, that the spacing between the notches 31 corresponds to 50 pounds, there are 50 major markings on scale 39 and the relative mass of the poises 32 and 37 correspond to such relationship. It will be understood, of course, that fractions of pounds may also be marked along the scale 39 between the major markings. Similarly, scale 41 corresponds to the other unit of measure (such as kilograms). Assuming that the spacing between notches 29 corresponds to 20 kilograms, there are 20 major markings along the length of scale 41, together with such fractional markings as may be desired.

Figure 3:
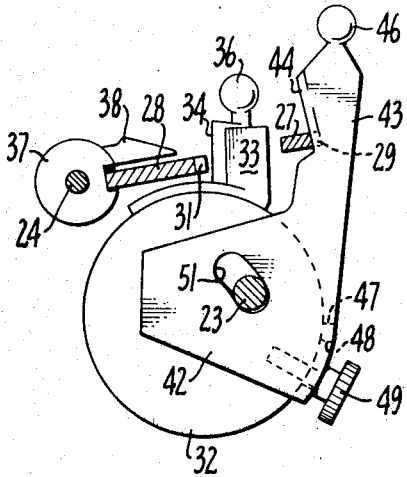
FIG. 3 is an enlarged sectional view taken substantially along the line 3—3 of FIG. 2 showing the poise in position of adjustment for weighing in accordance with the metric system.
Figure 4:
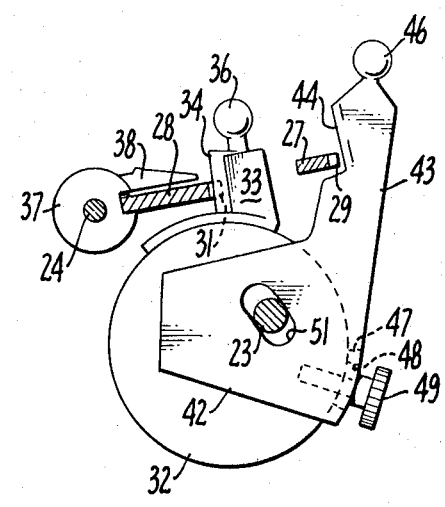
FIG. 4 is a view similar to FIG. 3 showing the poise in another position of adjustment for weighing in accordance with the avoirdupois system.

On the right-hand end of the poise 32 is an adjustable plate 42 having an arcuate slot 51 and an outward projection 43 carrying pivot 44 and a knob 46. An inwardly turned flange 47 on arm 42 has a slot 48 engaged by thumbscrew 49 which is threaded into poise 32. By loosening thumbscrew 49 and oscillating plate 42 relative to poise 32, the parts may be moved between the positions shown in FIG. 3 and FIG. 4. In the position of FIG. 3, pivot 44 slides along beam 27 until it fits into one of the notches 29 in beam 27. Pivot 34 is elevated relative to the notches 31 in beam 28 so that said notches 31 are not effective in positioning poise 32 along the length of beam 28. On the other hand, in the position of FIG. 4 arm 42 is turned clockwise relative to the position of FIG. 3 so that pivot 44 does not fit into the notches 29 in beam 27 whereas the pivot 34 drops into one of the notches 31 of beam 28. Adjustment between the two positions is easily accomplished without the use of any special tools and without the need of adding to or removing from the mass of poise 32.

What is claimed is:

1. In a scale beam construction, at least one rod, a first beam formed with longitudinally spaced first notches conforming to a first weight system, a second beam formed with longitudinally spaced second notches conforming to a second weight system, brackets holding both said beams and said rod parallel, a poise slidable along said rod having a first projection formed with a first pivot, a plate adjustably positioned on said poise having a second projection formed with a second pivot, and means on said poise for holding said plate in first and second positions of adjustment relative to said poise, said first pivot engaging said first beam and selectively fitting into said first notches and said pivot edge remote from said second notches when said plate is in first position, said first pivot remote from said first beam and said second pivot engaging said second beam and selectively fitting into said second notches when said plate is in second position.

2. In a scale beam construction according to claim 1, a second rod held in said brackets parallel to said first mentioned rod, a fractional poise of lesser mass than said first mentioned poise slidable on said second rod having a pointer, one said beam provided in the longitudinally spaced first and second lines of fractional markings corresponding to fractions of said first and second notches, said pointer moving in proximity to both said lines of fractional markings as said fractional poise is moved along said second rod.

3. A beam construction according to claim 1 in which said means comprises a plate having a portion formed with an elongated first slot receiving said rod and a flange transverse to said portion formed with an elongated second slot, and a member passing through said second slot and into said poise, said plate oscillatable relative to said poise, said member engaging said flange to hold said plate in first and second positions.

References Cited

FOREIGN PATENTS

| 214 | 1882 | Great Britain. |
|---|---|---|
| 959,617 | 6/1964 | Great Britain. |

ROBERT S. WARD, Jr., Primary Examiner

U.S. Cl. X.R.

177—246, 247